Jan. 24, 1939.                 G. T. HUXFORD                      2,145,026
           METHOD OF AND APPARATUS FOR TELEMETRIC RECEIVER INDICATING
                        Filed July 7, 1932          3 Sheets-Sheet 1

George T. Huxford
INVENTOR

BY Thomas A. Jenkes
ATTORNEY

Jan. 24, 1939.                G. T. HUXFORD                2,145,026
 METHOD OF AND APPARATUS FOR TELEMETRIC RECEIVER INDICATING
                  Filed July 7, 1932         3 Sheets-Sheet 2
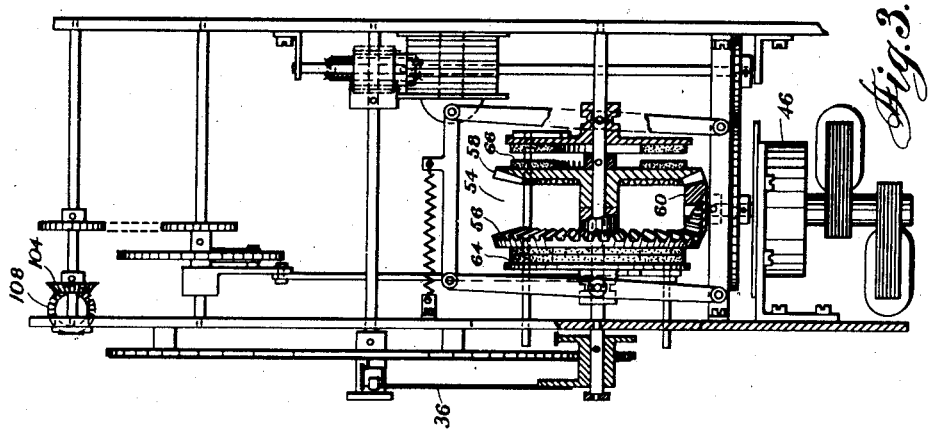
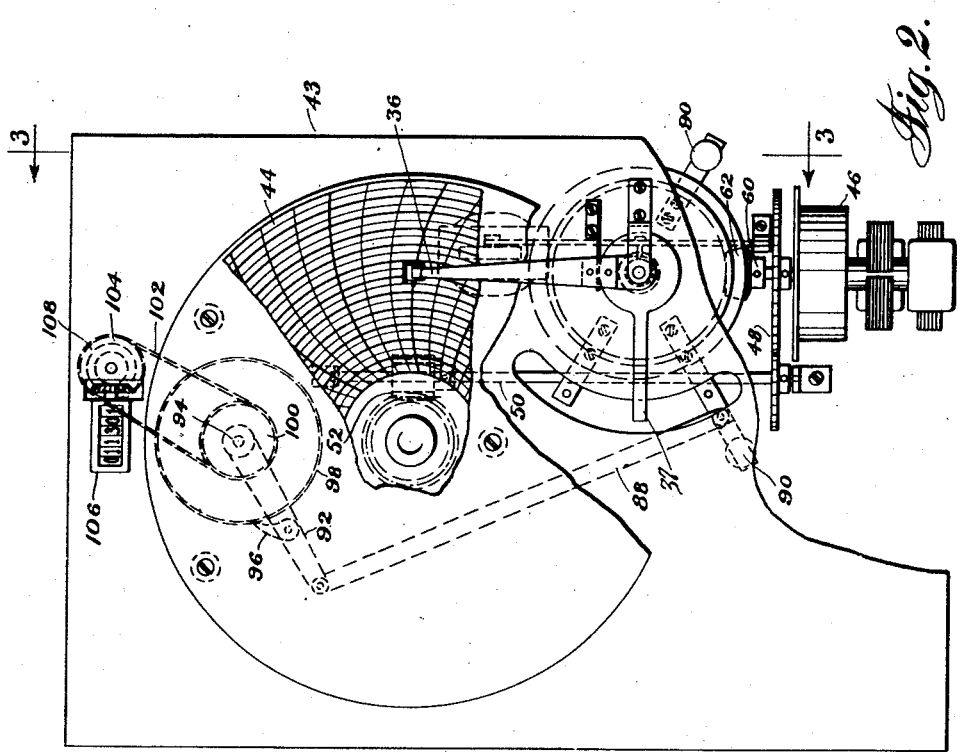
George T. Huxford
INVENTOR
BY Thomas A. Jenckes
ATTORNEY Patented Jan. 24, 1939

2,145,026

UNITED STATES PATENT OFFICE 2,145,026

METHOD OF AND APPARATUS FOR TELEMETRIC RECEIVER INDICATING

George T. Huxford, North Kingston, R. I., assignor to Builders Iron Foundry, Providence, R. I., a corporation of Rhode Island Application July 7, 1932, Serial No. 621,211

30 Claims. (Cl. 177—351)

My invention relates to improvements in the method of and apparatus for indicating and/or recording through a telemetric receiver, receiving cycles of transmission, each cycle being composed of portions of energization and portions of lack of energization, both of which vary in proportion to changes in the quantity to be measured. As sent from the transmitter each cycle is composed of a period of energization or lack of energization of a time duration proportionate to the quantity to be indicated and my improved method consists in moving the indicator arm the net difference between successive periods of energization or if desired lack of energization between successive cycles of transmission.

While this may be done in any desired manner, further features of my invention relate to the specific construction of apparatus I employ for this purpose, which includes a continuously operated well known type of gearing comprising two oppositely disposed bevel gears of equal size driven in opposite directions by a common pinion by a motor such as a synchronous motor which may be run at a synchronous speed with a synchronous motor in the transmitter and having clutch faces on each oppositely disposed vertically revolving gears thereof, each vertically revolving in opposite respective directions and two spaced clutch faces adapted to be alternately brought in juxtaposition against the oppositely rotating clutch faces on the respective bevel gears and each of these spaced clutch faces having an arm adapted to move a preferably braked indicator arm in opposite directions and telemetric receiving means operable during the period of energization in each cycle to bring one clutch face into juxtaposition against its respective bevel gear clutch face and during the period of lack of energization to bring the oppositely disposed spaced clutch face in juxtaposition with its respective bevel gear clutch face to alternately continuously move either one of said respective arms in the opposite direction. Inasmuch as the indicator arm is preferably braked it will be pushed by one arm in one direction and by the other arm in the opposite direction, thus on a succession of cycles each made up of a period of energization and a period of lack of energization by the amount each respective arm is moved during the relative portion of each cycle it is apparent that the braked indicator arm will be moved the net difference between energized or de-energized portions of each successive cycle. While any means for alternately bringing the spaced clutch faces into juxtaposition against their respective bevel gear clutch faces may be employed, I preferably employ electro-magnetic means for shifting the opposed clutch faces during the desired portions of the cycle, which said means may include a relay and may also if desired include magnetic clutch means for automatically moving the spaced clutch faces into contact with their respective bevel gear clutch faces during the desired portions of each successive cycle.

If desired the indicator arm may be made a recorder arm by having a revolving chart revolved by a suitable synchronous motor clock or otherwise and the arm having the recording medium thereon moved radially in opposite directions thereover from a zero to a maximum position.

These and such other objects of my invention as may hereinafter appear will be best understood from a description of the accompanying drawings, which illustrate various embodiments thereof.

In the drawings, Fig. 1 is a diagrammatic view partially in perspective and partially in section illustrating the skeleton formation of the braked indicator arm, bevel gear clutch and relay of my invention connected up with alternative embodiments of a telemetric transmitter forming the subject matter for patent for Telemetric transmitter, of John C. Thoresen, S. N. 621,022, filed July 6, 1932, now Patent No. 2,111,678, dated March 22, 1938.

Fig. 2 is a front elevation of the recorder register box constructed in accordance with my invention partially broken away to show the inside working of the device.

Fig. 3 is a side elevation of the parts shown in Fig. 2.

Figure 1:
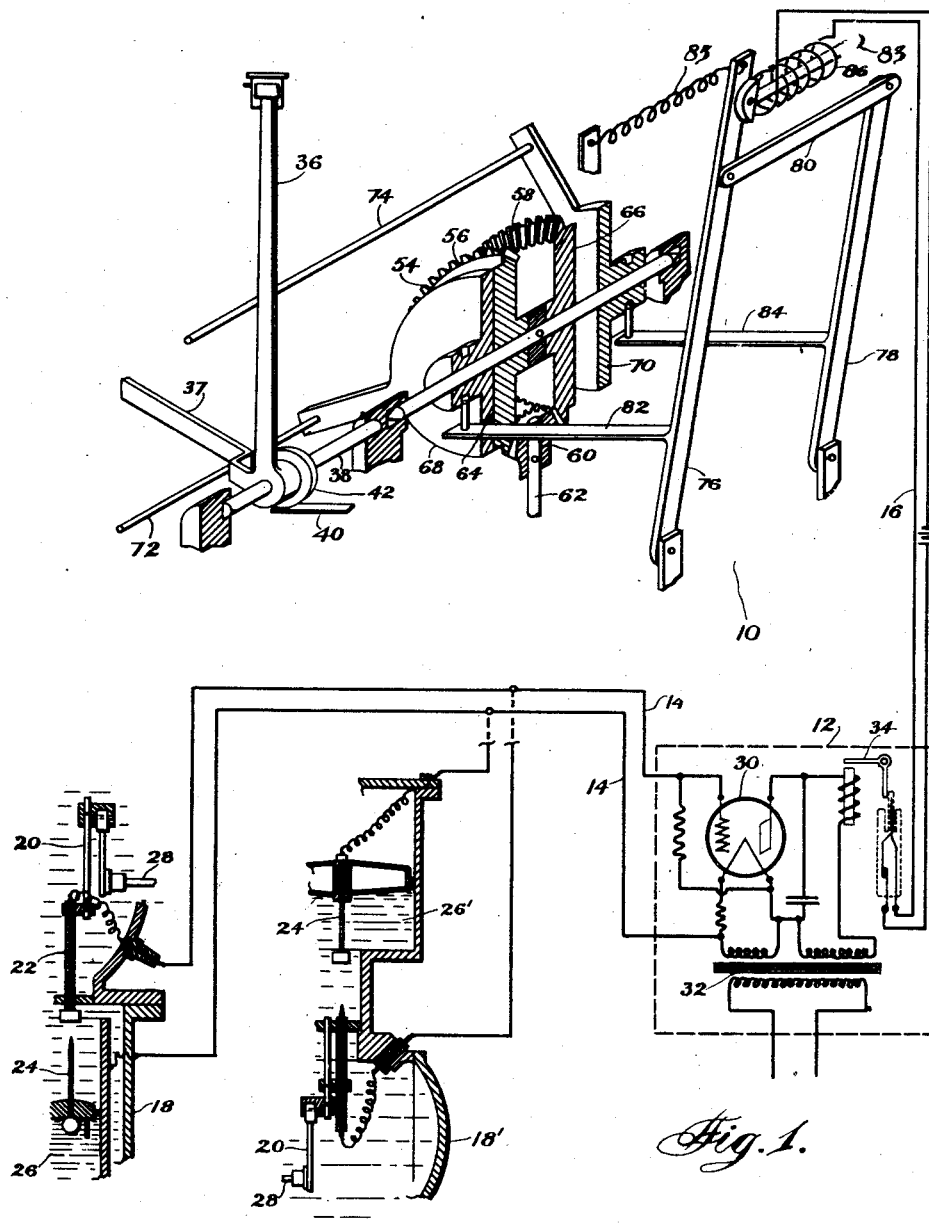

In the drawings, wherein like characters of reference indicate like parts throughout, 10 generally indicates a telemetric receiving apparatus constructed in accordance with my invention. The circuit therefor may include a suitable telemetric relay suitably connected by means of the terminals 14 to the telemetric circuit 16 which in turn is actuated by a suitable telemetric transmitter 18 or 18'.

I have shown diagrammatically in Fig. 1 alternative forms of such a transmitter which forms the subject matter of a patent application of John C. Thoresen for Telemetric transmitter, Serial Number 621,022, filed July 6, 1932, now Patent No. 2,111,678, dated March 22, 1938, particularly adapted to telemetrically transmit variations in the rate of flow of fluid in a conduit. In this device the rotating square root cam 20 actuates the contact former 22 into contact with the conducting member 24 which makes contact through a conducting medium 26. As the cam 22 revolves in square root cycles and as the surface of the conducting liquid 26 varies in accordance with periodic changes in the quantity to be metered, which in the specific embodiment shown is the rate of flow, it is obvious that in each cycle of rotation of the square root cam 20 a period of energization and a period of de-energization will be formed in the circuit the relative proportions or ratios of the periods of energization and de-energization in said cycle depending on the height of conducting liquid 26, the terminals 14 being suitably connected to said contact former 22 actuated in turn by the revolving square root cam 20 and to the conducting medium 18. The square root cam is mounted on the shaft 28 suitably revolved if desired by the synchronous clock (not shown). I have shown at the right a telemetric transmitter 18' adapted to telemeter with changes in the rate of flow in a gaseous medium which in a sense is the reverse of the transmitter shown as 18 on the left hand side and which may be alternatively connected to the telemetric circuit 16. In this device the synchronous clock rotates the shaft 28 to rotate the cam 20 which in turn moves the contact former 22 to reciprocate it upwards in square root cycles to come into contact with the conducting member 24 which in this instance is located in the nonconducting medium 26' to form the contact through the electrical circuit. It is obvious that either the transmitter 18 or the transmitter 18' may be employed or that other types of transmitters may be employed which set up cycles of transmission in which the period of energization of each successive cycle varies. A relay including an electronic tube 30, transformer 32 and magnetically operated switch 34 may be employed either at the transmitting or receiving end of the telemetric circuit 16 and I have shown such a relay in Fig. 1 as being located at the transmitting station. Such a relay is used in case it is desired to relay the impulses from one type of circuit to another. The receiving apparatus proper includes the indicator arm 36 suitably mounted on a shaft 38 which is preferably braked by means of the spring 40 abutting the collar 42 on said shaft or in any other suitable fashion. As shown in Fig. 2 said indicator arm 36 may if desired be employed as the pen arm 36 of a chart recorder 43, the chart 44 being suitably revolved by the synchronous motor 46 which through the gearing 48 and 52 and shaft 50 revolves the chart 44. The synchronous motor 46 is run at synchronous speed with the synchronous motor for driving the shaft 18 of the transmitter.

The indicator arm actuating means preferably includes a standard type of gearing 54, including the opposed bevel gears 56 and 58 suitably driven by a bevel pinion 60 mounted on the end of a shaft 62 suitably driven by the synchronous motor 46. The exterior surfaces of each of the bevel gears 56 and 58 form the respective clutch faces 64 and 66 respectively. I provide two spaced clutch faces 68 and 70, each having an arm 72 and 74 projecting respectively therefrom adapted to alternately abut opposite sides of an extension 37 of said indicator arm 36. Said spaced clutch faces are connected to the respective pivoted arms 76 and 78 joined together by the link 80 and each respectively connected to their respective clutch faces 68 and 70 by the connecting arms 82 and 84. The arms 76 and 78 are pivotally mounted at the lower end thereof and said arms thus connected by the link 80 have a solenoid core 83 projecting in one direction and the spring 85 adapted to normally urge said pivoted link motion 76, 78, and 80 suitably connected as stated to the clutches 68 and 70 in a direction to bring the solenoid core 83 out of its respective solenoid 86. The terminals of the solenoid 86 are suitably connected to the terminals of the telemetric circuit 16. It is thus apparent that during the portion of the cycle of rotation of the square root cam 20 when the telemetric circuit 16 is not energized, the spring 85 tends to pull the link mechanism to the left to bring the respective spaced clutch face 70 into engagement with the revolving differential gearing clutch face 66, thereby tending to revolve said clutch face 70 in an anti-clockwise direction to bring the arm 74 downwards to abut an extension 37 of the indicator arm 36 to move said indicator arm 36 to the left and as shown in Fig. 2 inwardly radially of the chart 44 and if there is no period of energization in said cycle to bring the recording arm 36 to an initial position. However, when there is a period of energization in said cycle, it is obvious that the solenoid 86 becomes energized for said period of energization of said cycle, thereby tending to pull the solenoid core 83 within the solenoid against the pressure of the spring and bring the clutch face 66 on the differential gear 58 and bring the oppositely disposed spaced clutch face 68 into engagement with its respective clutch face 64 on the oppositely revolving bevel gear 56 of the gearing 54 causing it to raise the arm 72 in a clockwise direction to abut the extension 37 to lift the indicator arm 36 upwards and move it radially outwards on the chart 44 toward a maximum position. It is thus obvious that in each square root or other cycle employed, the indicator arm will be moved outwards radially of the chart 44 during the period of energization as shown in Fig. 1 by the arm 72 and inwards during the period of de-energization in said telemetric circuit 16 from a maximum position by the arm 74 the respective clutch faces and arms 72 and 74 falling by gravity to their maximum outward or initial positions when not contacted by their respective clutch face. It is thus obvious that during a complete cycle including a period of energization and a period of de-energization, the position of the indicator arm 36 will be determined by the arms 72 and 74; said indicator arm being shifted from its previously set position to its new position whenever the period of energization differs from that of the preceding cycle. If the period of energization in a given cycle is less than that of the preceding cycle, the arm 74 shifts the indicator arm radially inwardly of the chart 44 to a position corresponding to the new value of the variable to which the transmitter is responsive. If, on the other hand, the period of energization is greater than that of the preceding cycle, arm 72 shifts the indicator arm radially outwards of the chart 44 to a position corresponding to the new value. It will also be apparent that since the sum of the periods of energization and de-energization in each of the cycles is constant, the sum of the extents of operation of the clutch elements 68, 70 in each cycle is likewise constant. Consequently these clutches may be said to act complementally, that is, for complemental times and through complemental extents in positioning the indicator arm. One quantity may be simply defined as the complement of another when their sum is a constant; this definition holding for the times and extents of clutch engagement and actuation respectively in this application. On successive cycles of energization, however, it is obvious that the period of energization may vary and in case it is greater than the next previous one the arm 72 will start from an initial position and push the arm 36 outwards from a position where it is stopped in the previous cycle an amount proportional to the amount that the second period of energization was greater than the first period of energization and if the second period of energization should be less in the second cycle and the period of de-energization greater it is obvious that in the second cycle the arm 74 will push the indicator arm inwards the net difference between periods of de-energization in successive cycles, thus providing positive means to push the indicator arm in either direction the net difference between successive periods of energization and/or de-energization in successive cycles. If it is desired to merely indicate it is obvious that a nonrotating scale in place of a revolving chart 44 may be provided and the position of the indicator arm 36 relative to said scale will indicate the then value of the quantity being metered. It is also apparent that in place of square root cycles as explained any other desired cycles containing periods of energization and de-energization may be provided. If it is desired also to apply a register it is apparent that as indicated in Figs. 2 and 3 a link 88 may be pivotally attached to the arm 72, which arms 72 and 74 respectively are provided with the weights 90 to aid them in returning either to their initial positions i. e. either their zero position or their maximum position respectively when out of contact with their respective clutch faces. The link 88 is attached to an arm 92 pivotally loosely mounted on the shaft 94 and has the pawl 96 pivotally mounted thereon which in turn engages the ratchet gear 98, sleeved to the sprocket 100, which in turn drives the chain 102 which may drive a sprocket 104 to drive a register mechanism through the medium of a cooperating bevel gear 108, it being well known in the art to drive a register mechanism 106 through the medium of the outward radial movement of an indicator arm 36 or actuating lever 72 preferably connected thereto which denotes either the relative period of energization or de-energization in a complete cycle to accurately register the quantity to be metered, which, actually registers only in proportion to the amount that the respective lever 72 or arm 36 may be moved. This registering attachment, however, provides a means for telemetering and registering the total amount or quantity to be metered in a desirable manner.

Figure 4:
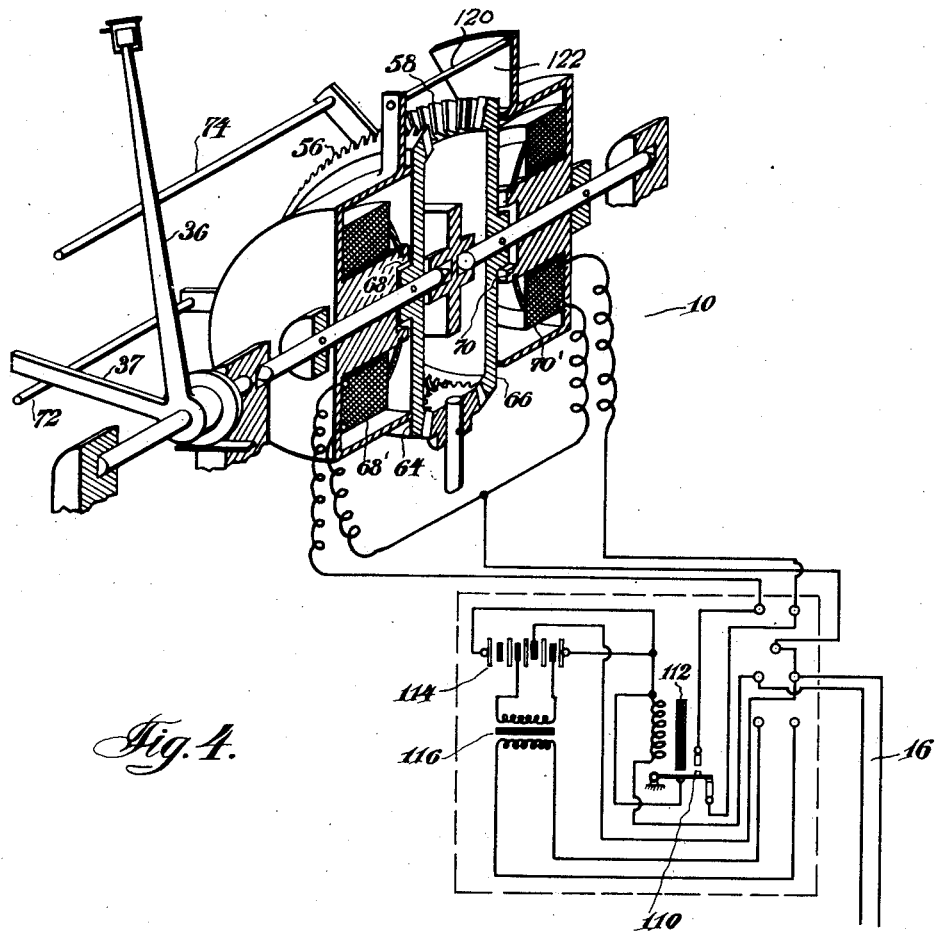
Fig. 4 is a diagrammatic perspective view partially shown in section generally similar to Fig. 1 of an alternative embodiment of my invention employing magnetic clutches.

I have shown in Fig. 4 an alternative embodiment of my invention functioning on more or less of a similar principle. In this embodiment the respective clutch faces 68 and 70 are brought into engagement with their respective clutch faces 64 and 66 by the medium of magnetic clutches, which are alternately energized in response to the periods of energization in each successive cycle or periods of de-energization thereof. So far as I am aware I am the first to apply the principle of magnetic clutches in the art of indicating or recording either with or without a bevel gearing system 54. I have also diagrammatically illustrated in Fig. 4 a type of gravity actuated relay mechanism which may be employed to alternately connect the magnetic clutches 68' and 70' through the medium of the gravity actuated receiving switch 110. During periods of energization of the telemetric circuit 16, it is obvious that the electro-magnet 112 will become energized to raise up the switch 110 to complete a circuit to actuate the magnetic clutch 68' to move the cooperating clutch face 68 into engagement with its cooperating clutch face 64 on its cooperating bevel gear 56. During the period of de-energization of the telemetric circuit 16 of said cycle, however, it is obvious that the electro-magnet 112 will become de-energized allowing the switch 110 to drop by gravity to complete a circuit to energize the magnetic clutch 70' to cause its clutch face 70 to engage with the cooperating clutch face 66 on its respective bevel gear 58, the current for the energization and de-energization of the magnetic clutches 68' and 70' being supplied by the rectifier unit 114 through the transformer 116. A rod 120 extends laterally from clutch 68' into cooperation with a projection 122 on clutch 70', whereby movement of either clutch into engagement with the clutch face of the corresponding bevel gear will positively throw the other clutch out of engagement with the clutch face of its associated bevel gear. It is thus obvious that when the clutch face 68 comes into engagement with the gear face 64 as in the embodiment heretofore described, the arm 72 projecting therefrom will operate to move the indicator arm 36 radially outwards relative to its indicating or recording medium 44 and that when the magnetic clutch 70' is energized due to the dropping of the switch 110, the arm 74 attached to the clutch face 70 will move downward to move the indicator or recording arm 36 the desired amount radially inwardly of the indicating medium or chart 44, this embodiment otherwise operating as hitherto explained for the embodiment shown in Figs. 1–3. It is thus obvious that through the medium of various transmitting or receiving relays employed a very feeble current may be stepped up into a sufficient current to either actuate the solenoid 86 or actuate the switch 110 to supply sufficient current to actuate the respective magnetic clutches 68' and 70'. It is apparent therefore that I have provided a novel method of indicating in a receiver of a telemetric system which comprises moving an indicator arm the net difference between portions of energization or de-energization in a total cycle comprising a portion of energization and a portion of de-energization by positively moving an indicating arm in one direction in accordance with variations in the portions of energization and positively moving the indicating arm in the opposite direction in accordance with variations in the portions of de-energization in said cycle and various embodiments of an improved apparatus therefor and an improved specific apparatus for this purpose either in combination with a registering mechanism or otherwise constructed of a minimum number of parts.

It is apparent that my improved device may be constructed alternatively to function in different directions during periods of energization or de-energization and I therefore employ these words interchangeably in the claims.

It is understood that my invention is not limited to the specific embodiments shown or methods described and that various deviations may be made therefrom without departing from the spirit and scope of the appended claims.

What I claim is:

1. In a telemetric receiver indicator, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced clutch faces each having an arm projecting therefrom adapted to alternately abut opposite sides of said indicator arm, a telemetric receiver having a solenoid connectable to the terminals of a telemetric circuit adapted to be energized by cyclic impulses of said circuit and having a core connected to both of said spaced clutch faces, means to normally urge said core outwardly to bring one spaced clutch face into contact with a bevel gear clutch face to move its respective arm to tend to move said braked indicator arm in one direction, said core being adapted on periodic energization of said solenoid to bring the other spaced clutch face into contact with its bevel gear clutch face to tend to move its respective arm to move said braked indicator arm in the opposite direction and means to return the respective spaced clutch faces and respective arms to a respective initial position when not contacted by their respective gearing clutch faces.

2. In a telemetric receiver indicator, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced clutch faces each having an arm projecting therefrom adapted to alternately abut opposite sides of said indicator arm, means to normally urge one clutch face into contact with one bevel gear clutch face and the spaced clutch face free of its respective bevel gear clutch face and means responsive to cyclic flows of current in said receiver to move the other spaced clutch face in opposition to said urging means into contact with its respective bevel gear clutch face to move its respective arm to tend to move said indicator arm in the opposite direction and to free said other spaced clutch face and means to return the respective spaced clutch faces and respective arms to a respective initial position when not contacted by their respective gearing clutch faces.

3. In combination with a telemetric circuit, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced clutch faces each having an arm projecting therefrom adapted to alternately abut opposite sides of said indicator arm, a receiver for said telemetric circuit, including electro-magnetic means responsive to cyclic flows of current in said circuit to urge one spaced clutch face into contact with one bevel gear clutch face to move its respective arm to tend to move said braked indicator arm in one direction and means responsive to a lack of energization in said circuit between said cyclic flows of current to urge the other spaced clutch face into contact with its respective bevel gear clutch face to move its respective arm to tend to move said braked indicator arm in the opposite direction and means to return the respective spaced clutch faces and respective arms to a respective initial position when not contacted by the respective gearing clutch faces.

4. In a telemetric receiver indicator connectable to a circuit having cyclic signalling flows of current therein, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced magnetic clutches each being adapted to alternately engage its respective clutch surface on its respective bevel gear, when energized and having an arm projecting therefrom adapted to alternately abut opposite sides of said indicator arm, a telemetric receiver including means responsive to cyclic flows of current in said circuit to actuate one magnetic clutch to bring it into contact with its respective bevel gear face to move its respective arm to tend to move said braked indicator arm in one direction and gravity operated switch means responsive to a lack of energization in said circuit between said cyclic flows of current to energize the opposite magnetic clutch to bring it into engagement with its respective bevel gear clutch face to move its respective arm to tend to move said braked indicator arm in the opposite direction and means to return the respective spaced clutch faces and respective arms to a respective initial position when not contacted by their respective gearing clutch faces.

5. In a telemetric receiver indicator connectable to a circuit having cyclic signalling flows of current therein, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced clutch faces each having an arm projecting therefrom adapted to alternately abut opposite sides of said indicator arm, a magnetic clutch for each clutch face adapted to bring itself and its respective spaced clutch face into engagement with its respective bevel gear clutch face, a telemetric receiver including means responsive to cyclic flows of current in said circuit to actuate one magnetic clutch to bring it and its respective spaced clutch face into contact with its respective bevel gear face to move its respective arm to tend to move said braked indicator arm in one direction and means responsive to a lack of energization in said circuit between said cyclic flows of current to energize the opposite magnetic clutch to bring it and its respective clutch face into engagement with its respective bevel gear clutch face to move its respective arm to tend to move said braked indicator arm in the opposite direction and means to return the respective spaced gearing clutch faces and respective arms to a respective initial position when not contacted by the respective gearing clutch faces.

6. In a telemetric receiver indicator connectable to a circuit having cyclic signalling flows of current therein, a braked indicator arm, two oppositely disposed bevel gears of substantially equal size, means comprising a bevel pinion for driving said gears continuously in opposite directions at equal speed, said bevel gears having clutch faces on the exterior surfaces thereof, two spaced magnetic clutches each having an arm projecting therefrom adapted to alternately abut opposite sides of said indicator arm and adapted to bring its respective clutch face into engagement with its respective bevel gear clutch face, relay means actuated by the time duration of impulses in said electric circuit adapted to energize one magnetic clutch to bring it into juxtaposition with its respective bevel gear clutch face to move its arm to tend to move the indicator arm in one direction and adapted on lack of energization in said circuit to energize the opposite magnetic clutch to bring its respective clutch face into juxtaposition with its respective bevel gear clutch face to move its respective arm to tend to move said indicator arm in the opposite direction and means to return the respective spaced clutches and respective arms to a respective initial position when not contacted by their respective gearing clutch faces.

7. In a telemetric receiver, driving means operating two parts in opposite directions, a plurality of clutches alternately electro-magnetically operated and mechanical interconnecting means whereby one clutch, in moving into operative position, throws the other out of action.

8. In apparatus for indicating a quantity, the combination of driving means, two clutches operated thereby, means common to said clutches and engaging the same for establishing and disestablishing operative relation between said clutches and said driving means, two arms operated by said clutches in opposite directions through complementary extents, a braked indicator arm alternately positionable in opposite directions by each of said arms whereby said indicator is positioned in correspondence with said quantity.

9. A telemetric receiver having a braked indicator arm alternately positionable by two clutch operated means, and stationary electro-magnetic operating means for said clutches mounted on the receiver.

10. In a telemetric receiver, a braked indicator arm, constant speed driving means, means comprising a pair of clutch elemnts for transmitting movement from said driving means to said indicator arm in either of opposite directions, a solenoid responsive to cyclic flow of current in a telemetric circuit and having a portion thereof connected to said clutch elements for engaging one of said elements with said driving means and freeing the other in response to flows of current in said circuit, and means for normally urging said other of said clutch elements into engaging relation to said driving means and freeing the first mentioned one of said clutch elements.

11. In a telemetric receiver, a braked indicator arm, constant speed driving means, means comprising a pair of clutch elements for transmitting movement from said driving means to said indicator arm in either of opposite directions, said clutch elements having arms connected thereto and adapted to alternately abut opposite sides of said indicator arm, means to normally urge one of said clutch elements into engagement with said driving means and the other clutch element free of said driving means, means responsive to cyclic flows of current in said receiver to move said other clutch element in opposition to said urging means into engagement with said driving means and to free the first mentioned clutch element, and means to return the respective arms to respective initial positions when the respective clutch elements are disengaged from said driving means.

12. In a telemetric receiver, a braked indicator arm, constant speed driving means, means comprising a pair of clutch elements for transmitting movement from said driving means to said indicator in either of opposite directions, arms connected to the respective clutch elements and adapted to alternately impart movement in opposite directions to said indicator arm, means responsive to cyclic flows of current in a telemetric circuit for establishing a driving connection between said driving means and one of said clutch elements to move its respective arm to move said braked indicator arm in one direction, means responsive to a lack of energization in said circuit between said cyclic flows of current to establish a driving connection between said driving means and the other clutch element to move its respective arm through an extent complemental to the extent of movement of the first mentioned clutch arm, and means to return the respective clutch arms to respective initial positions.

13. In a telemetric apparatus connectable to a circuit having cyclic signalling flows of current therein, a braked indicator arm, constant speed driving means, means comprising a pair of clutch elements for transmitting movement from said driving means to said indicator in either of opposite directions, arms connected to the respective clutch elements and adapted to alternately abut opposite sides of said indicator arm, an electromagnet for each clutch element adapted to bring the respective element into engagement with said driving means, means responsive to cyclic flows of current in said circuit to cause one of said electromagnets to bring its respective clutch element into engagement with said driving means to move its respective arm to tend to move said braked indicator arm in one direction, means responsive to a lack of energization in said circuit between said cyclic flows of current to energize the other electromagnet to bring its respective clutch element into engagement with said driving means to move its respective arm through an extent complemental to the extent of movement of the first mentioned clutch arm, and means to return the respective clutch arms to respective initial positions.

14. In a telemetric receiver responsive to cyclical signalling impulses in a telemetric circuit, a shaft having a braked indicator arm thereon, constant speed driving means, means comprising a pair of clutch elements mounted independently of said shaft for transmitting movement from said driving means to said indicator in either of opposite directions, arms connected to said clutch elements and adapted to alternately abut opposite sides of said indicator arm, and means responsive to said signals for engaging said clutch elements with said driving means to operate said clutch arms through complemental extents in each cycle.

15. In a telemetric receiver, a shaft having a braked indicator arm thereon, constant speed driving means, means comprising a pair of clutch elements mounted independently of said shaft for transmitting movement from said driving means to said indicator in either of opposite directions, arms connected to said clutch elements and adapted to alternately abut opposite sides of said indicator arm, a shaft separate from the first mentioned shaft and upon which said clutch elements are mounted, and means responsive to signals in a telemetric circuit for engaging said clutch elements with said driving means.

16. A telemetric receiver as defined by claim 15, wherein said shafts are disposed coaxially to each other.

17. A telemetric receiver as defined by claim 15, wherein the means responsive to signals in the telemetric circuit for engaging said clutch elements with said driving means comprises a pair of electromagnets mounted on the second mentioned shaft, for operating the respective clutch elements.

18. In a telemetric receiver, a braked indicator arm, constant speed driving means comprising a pair of oppositely rotating gears, a pair of clutch elements disposed respectively on opposite sides of said gears, arms connected to the respective clutch elements and adapted to alternately abut the opposite sides of said indicator arm, and means responsive to signals in a telemetric circuit for controlling engagement of said clutches with said driving means wherein the last mentioned means responsive to signals comprises a pair of electromagnets for engaging the respective clutch elements with said driving means, said electromagnets being positioned on opposite sides of the oppositely rotating gears.

19. In a telemetric receiver, a braked indicator arm mounted on a shaft, a pair of oppositely rotating gears, constant speed driving means directly connected thereto, a pair of clutch elements disposed respectively on opposite sides of said gears and mounted on means separate from said shaft, arms connected to the respective clutch elements and adapted to alternately abut the opposite sides of said indicator arm, and means responsive to signals in a telemetric circuit for controlling engagement of said clutches with said driving means.

20. In a telemetric receiver, a braked indicator arm, constant speed driving means, and means comprising a solenoid responsive to cyclic flows of current in a telemetric circuit for causing movement of said arm in one direction as long as said current is on, and a spring for causing movement of said indicator arm in the other direction as long as said current is off.

21. A receiving device of the type referred to, comprising a motor driven shaft, two movable members movable in opposite directions from positions of rest, electro-magnetic means, means controlled by said electro-magnetic means for connecting said shaft to said movable members alternately, one during the entire time that the electro-magnetic means is energized and the other during the entire time that the electro-magnetic means is de-energized, to move each member a distance proportional to the time during which the shaft and member are operatively connected, means for returning each of said movable members to its position of rest upon being disconnected from said shaft, and an indicating member movable by said movable members.

22. In apparatus for reproducing movement proportionally of the class wherein the transmitting device closes an electric circuit in successive intervals of time for a proportion of each time interval which varies according to the movement to be reproduced, the combination with said transmitting device of a receiving device comprising two movable members movable in opposite directions from positions of rest, electromagnetic means connected in said circuit, means controlled by said electro-magnetic means for moving one of said members during the entire time that said circuit is closed and for moving the other of said members during the entire time that said circuit is open at a rate having a fixed relation to the length of said time intervals, means for returning said members to their positions of rest, and an indicating member movable by said movable members.

23. In apparatus for reproducing movement proportionally of the class wherein the transmitting device comprises a movable member and circuit controlling means operative to close said electric circuit periodically for periods of time which vary with changes in position of said movable member, the combination with said transmitting device of a receiving device comprising an indicating member, two positioning members movable alternately from positions of rest for moving the indicating member in opposite directions, an electro-magnet connected in said circuit, and means controlled by said electro-magnet for moving one of said positioning members during all the time that said circuit is closed at the transmitting device and for moving the other of said positioning members during all the time that said circuit is open at the transmitting device to effect changes in position of the indicating member corresponding to changes in position of said movable member of the transmitting device, the length of movement of each of said positioning members at each cycle of operations being equal to the distance which it would move if moved during the whole of one cycle less the distance through which the other of said members is moved during said cycle.

24. In apparatus for reproducing movement proportionally of the class wherein the transmitting device closes an electric circuit in successive intervals of time for a proportion of each time interval which varies according to the movement to be reproduced, the combination with said transmitting device of a receiving device comprising two movable members movable in opposite directions from positions of rest, driving means for moving said members from their positions of rest at a rate having a fixed relation to the length of said time intervals, electro-magnetic means connected in said circuit, means controlled by said electro-magnetic means for connecting the driving means to move one of said members during the entire time that said circuit is closed at the transmitting device and for connecting the driving means to move the other of said members during the entire time that said circuit is open at the transmitting device, means for returning said members to their positions of rest when disconnected from the driving means, and an indicating member movable by said movable members.

25. In apparatus for reproducing movement proportionally, of the class wherein the transmitting device closes an electric circuit in successive uniform intervals of time for a portion of each time interval which varies according to the movement to be reproduced, the combination with said transmitting device of a receiving device comprising two movable members movable in opposite directions from positions of rest, constant speed driving means for moving said members from their positions of rest, electro-magnetic means connected in said circuit, means controlled by said electro-magnetic means for connecting the driving means to move one of said members during the entire time that said circuit is closed at the transmitting device and for connecting the driving means to move the other of said members during the entire time that said circuit is open at the transmitting device, means for returning said members to their positions of rest when disconnected from the driving means, and an indicating member movable by said movable members.

26. In apparatus for reproducing movement proportionally of the class wherein the transmitting device comprises a movable member and circuit controlling means operative to close said electric circuit in successive intervals of time for a proportion of each time interval which varies proportionately with changes in position of said movable member, the combination with said transmitting device of a receiving device comprising an indicating member, two movable members movable in opposite directions from positions of rest, electro-magnetic means connected in said circuit, and means controlled by said electromagnetic means for moving said movable members alternately from their positions of rest to position the indicating member, the distances one of said movable members is moved being proportional to and varying with the periods during which said circuit is closed and the distances the other of said movable members is moved being proportional to and varying with the periods during which said circuit is open, whereby the indicating member is positioned to indicate the position of said movable member of the transmitting device.

27. In apparatus for reproducing movement proportionally of the class wherein the transmitting device comprises a movable member and circuit controlling means operative to close said circuit in successive intervals of time for a proportion of each time interval which varies proportionately with changes in position of said movable member, the combination with said transmitting device of a receiving device comprising an indicating member, two movable members movable in opposite directions from positions of rest, electro-magnetic means connected in said circuit, and means controlled by said electromagnetic means for moving said movable members alternately from their positions of rest to position the indicating member to indicate the position of said movable member of the transmitting device, one of said movable members being moved away from its position of rest during the entire time that the electro-magnetic means is energized and the other of said movable members being moved away from its position of rest during the entire time that the electro-magnetic means is de-energized.

28. In apparatus for reproducing movement proportionally of the class wherein the transmitting device comprises a movable member, circuit controlling means including a movable circuit closing member connected in said circuit, a motor driven member for operating said circuit closing member to close said circuit for a portion of each successive interval of time during which said member makes a predetermined movement, and means controlled according to the position of said movable member for varying the proportion of said time interval that the circuit is closed at each operation of said circuit closing member proportionately with changes in position of said movable member, the combination with said transmitter of a receiving device comprising an indicating member, two movable members movable in opposite directions to position said indicating member, motor driven driving means for moving said movable members from positions of rest, the speed of said driving means having a fixed relation to the speed of the driven member of the transmitting device, electro-magnetic means connected in said circuit, means controlled by said electro-magnetic means for connecting the driving means to move said movable members alternately from their positions of rest to position the indicating member, one of said movable members being so moved during the entire time that the circuit is closed and the other being so moved during the entire time that the circuit is open, and means for returning said movable members to their positions of rest when disconnected from said driving means.

29. A receiving device for connection in an electric circuit which is closed in successive intervals of time for a proportion of each time interval which varies according to a movement to be reproduced, comprising an indicating member, two movable members movable in opposite directions from positions of rest and adapted to move the indicating member in opposite directions, driving means for moving said members from their positions of rest at a rate having a fixed relation to the length of said time intervals, means for returning said members to their positions of rest when disconnected from the driving means, electro-magnetic means to be connected in said circuit, and means controlled by said electro-magnetic means for connecting the driving means to move one of said members during the entire time that the electro-magnetic means is energized and to move the other of said members during the entire time that the electro-magnetic means is deenergized, the positions of rest of said members being spaced apart a distance such that movement of either of said movable members if continued during the whole of one cycle of operations would move the indicating member into engagement with the other of said movable members at its position of rest.

30. In apparatus for reproducing movement proportionally of the class wherein the transmitting device closes an electric circuit in successive intervals of time for a proportion of each time interval which varies according to the movement to be reproduced, the combination with said transmitting device of a receiving device comprising two movable members movable in opposite directions from positions of rest, electro-magnetic means connected in said circuit, means controlled by said electro-magnetic means for moving one of said members at a constant speed during the entire time that said circuit is closed and for moving the other of said members at the same constant speed during the entire time that said circuit is open, means for returning said members to their positions of rest, and an indicating member movable by said movable members.

GEORGE T. HUXFORD.